May 12, 1953

L. LAWRENCE, JR 2,637,973

ROCKET ENGINE HAVING TURBINE LOCATED IN NOZZLE FOR DRIVING AUXILIARIES

Filed April 1, 1949

INVENTOR
Lovee Lawrence Jr.

Patented May 12, 1953

2,637,973

UNITED STATES PATENT OFFICE 2,637,973

ROCKET ENGINE HAVING TURBINE LOCATED IN NOZZLE FOR DRIVING AUXILIARIES

Lovell Lawrence, Jr., Denville, N. J., assignor to Reaction Motors, Inc., Dover, N. J., a corporation of New Jersey Application April 1, 1949, Serial No. 84,919

18 Claims. (Cl. 60—35.6)

The present invention relates to a jet reaction or rocket motor producing a useful propulsive thrust by the recoil action of a high velocity gas jet, particularly to rocket motors, actuated by the continuous combustion in a chamber of two or more liquid propellants fed under pressure to the motor; and it further relates to a single cylinder reaction motor in which the amount of thrust delivered by the motor can be varied by operation of a manual throttle.

One object of this invention is to provide a reaction motor which not only can be throttled manually to give a linear output of thrust, but which automatically utilizes the power existent in the rush of hot gases from its combustion chamber to operate pumps which force fuel and oxidizer into the combustion chamber in the proper quantities for the amount of thrust desired.

Such an arrangement is believed to represent a considerable step forward in the art of rocket jet propulsion, particularly in the propulsion of aircraft where small amounts of power are desirable for economical cruising operation of the aircraft so as to conserve fuel and yet large amounts of power are necessary for takeoff or flight at high speed.

The change in the amount of thrust delivered by the engine is obtained by increasing or decreasing the quantity of propellants delivered to the combustion chamber. In rocket engines which have gone heretofore, throttling by varying the quantity of propellants was found to be uneconomical of fuel. The present invention solves this difficulty by providing a way of maintaining a high efficiency by keeping combustion chamber pressure constant at the maximum level throughout the range of thrust of the engine both by varying the exit area of the exhaust nozzle and by utilizing a small fraction of the total power available in the engine to drive pumps to deliver propellants to the combustion chamber in the proper quantities.

A specific object of the invention is to provide a restrictor bulb attached to a central shaft to be used as the means of varying the exit area of the nozzle. This bulb can be moved into or out of the annular exhaust nozzle to increase or decrease the area of the opening at that point. Upon the exterior of the bulb are vanes inclined at an angle α to the direction of flow of the hot gases of combustion so as to cause rotation of the bulb and its attached shaft. This shaft is connected by means of gearing to propellant pumps so that as the shaft rotates the pumps will operate to supply propellants to the combustion chamber of the engine. An important feature of this device is that the end of the combustion chamber nearest the bulb is flared outwardly. The combination of this outward flare and the curve of the inner end of the bulb is such that, as the bulb is moved away from the nozzle opening, the space between the inner end of the bulb and the flared chamber wall decreases thereby causing the hot gases of combustion to flow faster through the narrow space thus increasing the speed of rotation of the bulb, shaft and pumps and thereby supplying more propellants to the combustion chamber. Conversely movement of the bulb into the nozzle results in an increase in the space between the inner end of the bulb and the flared portion of the chamber wall thus decreasing the velocity of flow past the vanes of the bulb, decreasing the speed of rotation of the shaft, and decreasing the quantity of propellants delivered to the combustion chamber.

Motion of the restrictor bulb toward or away from the exhaust nozzle is accomplished by means of a hydraulic piston and cylinder arrangement actuated by a manually controlled hydraulic system.

A typical means of starting the engine is shown and described herein, but it is conceivable that other systems might be used without changing the inventive nature of the engine.

The engine described herein as the preferred embodiment of this invention utilizes nitric acid and aniline as its propellants. These are commonly known as propellants for rocket engines, the aniline acting as the fuel and the acid as the oxidizer. Since these fluids cause combustion upon contact with one another, no separate igniting means is shown.

Other objects of the invention will be pointed out in the following description and claims and illustrated in the accompanying drawings, which disclose, by way of example, the principle of the invention and the best mode, which has been contemplated, of applying that principle.

In the drawings:

Fig. 9 is an enlarged view of a restricting member of modified configuration.

The following detailed description follows in general a logical sequence in the steps of assembly and a description of the operation of the device is included at the end of the detailed descriptive matter.

Figure 1:
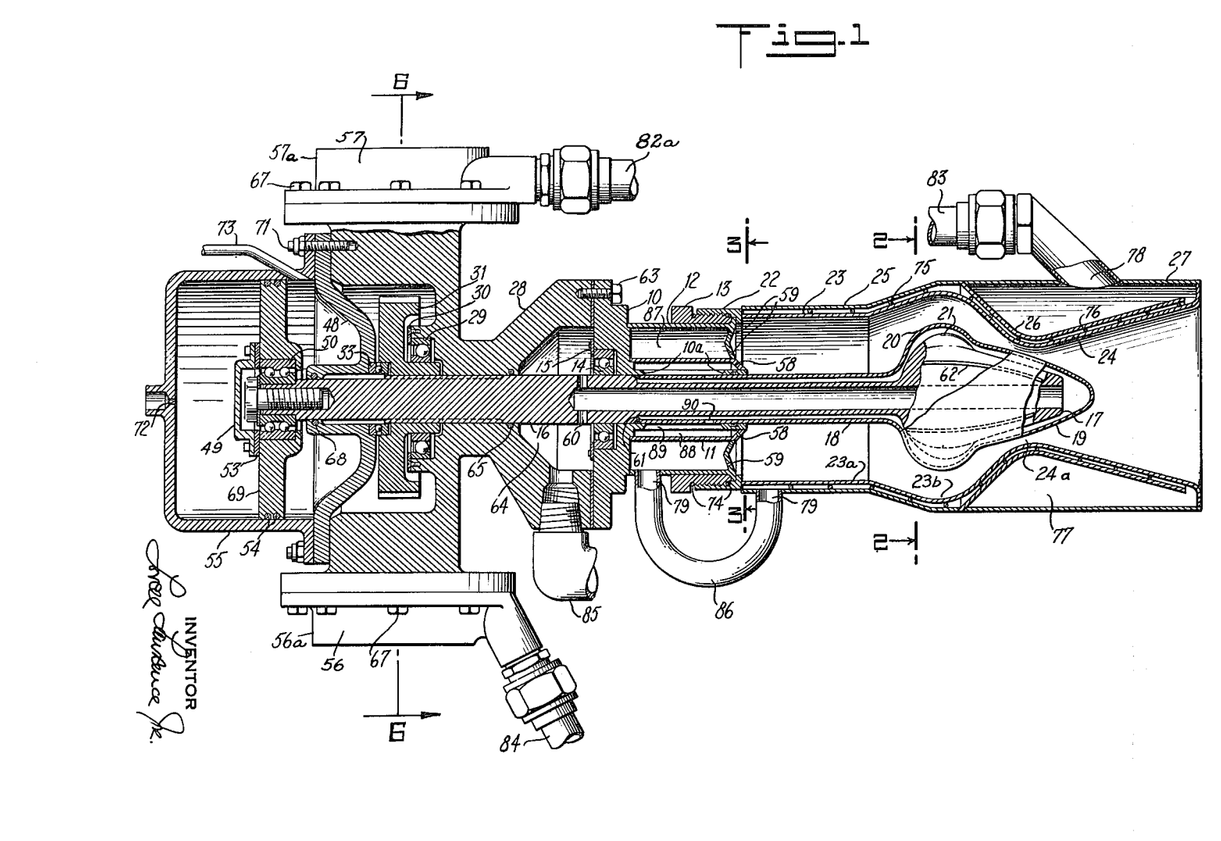
Fig. 1 is a sectional elevation through the assembled rocket motor.
Figure 3:
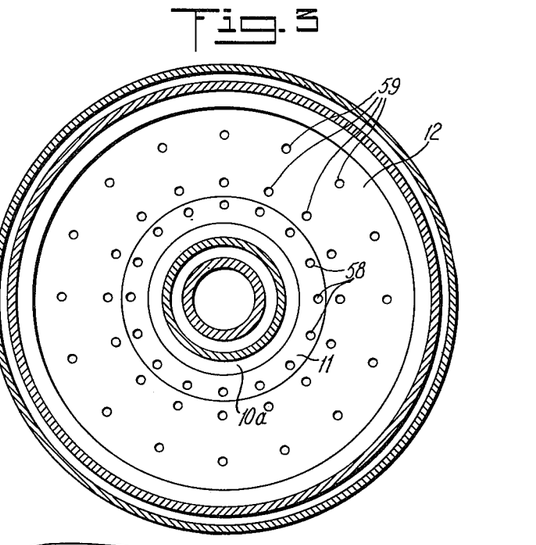
Fig. 3 is an enlarged view of a section taken on lines 3—3 of Fig. 1.
Figure 4:
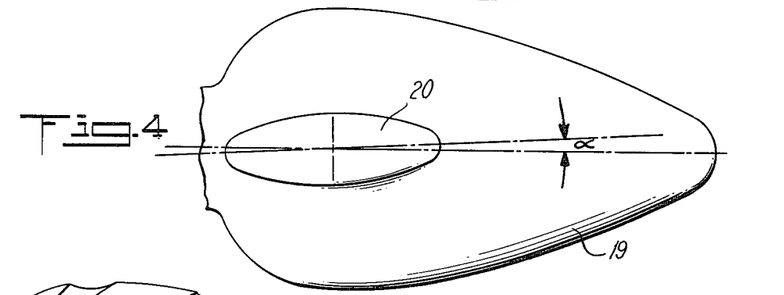
Fig. 4 is an enlarged view of a plan elevation of the bulb showing the vane arrangement.

Referring to Fig. 1, circular plate 10 has an integral cylindrical sleeve 10a extending outward, perpendicular to its face as shown, and has a central hole through it for passage of a shaft 16 as described later. Over the extended sleeve 10a of plate 10 is a cylinder 11 one end of which is welded to the face of plate 10. Its other end terminates in a frustum of a cone, the periphery of the small diameter of which is welded to the outer end of the sleeve of plate 10. An annular space 88 is thus formed between cylinder 11 and the sleeve 10a of plate 10. An outer cylinder 12 is located about inner cylinder 11 and is spaced from it with one end thereof also welded to the face of plate 10. Its other end has an inner lip which has a V shaped depression in it as shown. The inner periphery of this lip is welded to the outer periphery of cylinder 11 at the base of the conical portion. Small holes 59 (see also Fig. 3) are provided in the lip, their axes being perpendicular to the faces of the lip. Similar small holes 58 are provided in the conical portion of inner cylinder 11. With outer cylinder 12 in place, an annular space 87 is formed between it and inner cylinder 11.

About the exterior of outer cylinder 12 is fitted a collar 13 which fits against a lip on the outer periphery of cylinder 12 in the manner shown and has screw threads upon its outside. On the left face of plate 10 is a recess which houses a ball bearing 14 held in place by retainer 15 and supporting shaft 16.

The group of parts so far described comprise a unit which may be called a head or an injector head.

Figure 2:
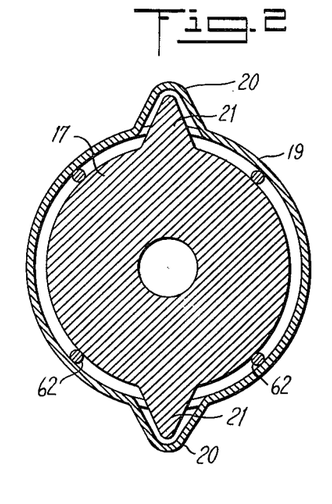
Fig. 2 is an enlarged view of a section of the restrictor and vanes only taken on lines 2—2 of Fig. 1.

Through the central opening in this injector head extends the central shaft 16, at the end of which shaft, nearest injector holes 58 and 59, is welded a bulb 17 of a shape substantially as shown and which has solid vane baffles 21 welded upon it. Bulb 17 is solid except for a central hole through its longitudinal axis which hole extends back along the longitudinal axis of shaft 16 to connect with holes 60 in shaft 16. Shaft 16 is reduced in diameter at 61 and an outer cylindrical shell 18 is welded to the shoulder at 61. Shaft 16 is sufficiently reduced in diameter and shell 18 has a sufficiently thin wall, that an annular space exists between these members. Shell 18 is belled outward at its other end in the form of a jacket 19 to follow the contour of bulb 17 with a narrow space or envelope between the two members and has hollow vanes 20 welded upon it. Spacing rods 62 (see Fig. 2) are welded to bulb 17 and spot-welded to bulb jacket 19 which is of formed metal and shaped to fit the contour of bulb 17 with allowance for space between the two members determined by the diameter of spacing rods 62. Suitable slots are cut in member 19 to allow vane baffles 21 to project and formed metal vanes 20 are fitted over vane baffles 21, spaced from it to create a cooling passage. Member 19 may also be called a restricting member. An alternate type of restricting member is shown in Figure 9. Instead of vanes located upon the exterior of the member, a helical groove 20a is recessed into its exterior in the manner shown. The rush of hot gases from the combustion chamber in flowing past the member tends to follow the groove rather than its normal, relatively straight path of flow, thus a twisting moment is imparted to the restricting member and its attached shaft.

The opposite end of shaft 16 extends through housing 28 which is attached to plate 10 by means of bolts 63. Housing 28 has a recess formed in it so that chamber 64 is created when plate 10 and housing 28 are bolted to one another. A central hole in housing 28 permits passage of shaft 16, a fluid-tight seal being provided at 65. The opposite side of housing 28 is open to form a recess for ball bearing 29, held in place by retaining ring 30, and to form a larger recess to house gear 31 which is slidably fitted to spline 32 of shaft 16 (see Fig. 6). Gear 31 is free to slide upon shaft 16 and yet will be turned positively by any rotation of the shaft. Movement of gear 31 away from bearing 29 is prevented by thrust bearing 33.

Figure 6:
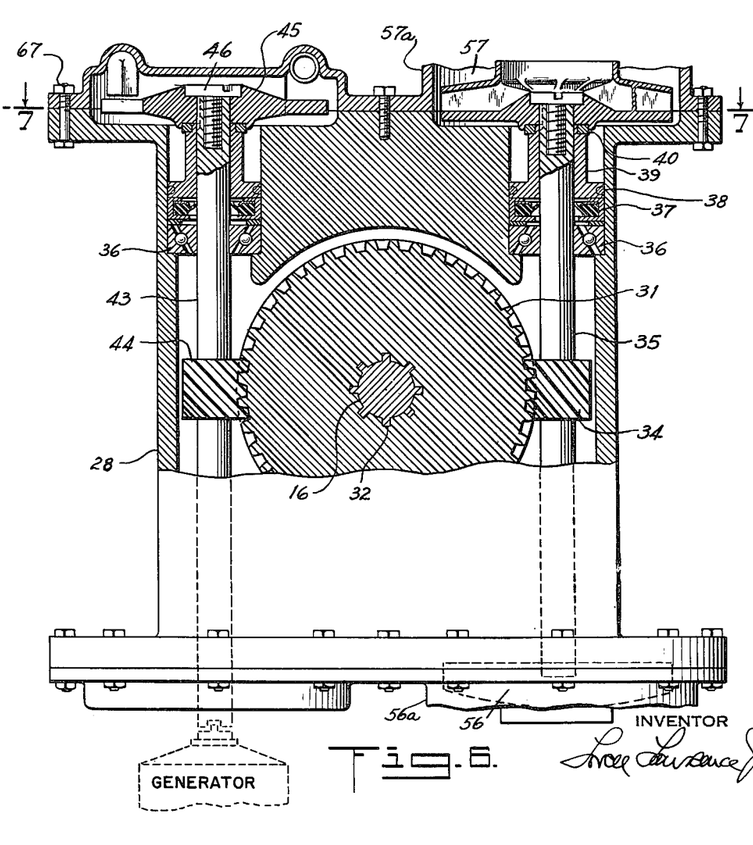
Fig. 6 is an enlarged view of a section taken on lines 6—6 of Fig. 1.

Reference to Fig. 6 shows two parallel secondary shafts 35 and 43 mounted in housing 28 with their longitudinal axes substantially in the plane of gear 31. Each shaft is arranged to be rotated by an integral spiral bevel pinion gear. These gears are numbered 34 and 44 respectively. Each shaft is supported by ball bearings 36 set into recesses in housing 28 and supported thereby. Directly adjacent to bearing 36 and on the side away from pinion gear 34 is a fluid-tight seal 37 of resilient material. Next to seal 37 is a supporting sleeve 39 having a fluid-tight seal 38 set in the periphery of its shoulder. The end of this bearing sleeve supports a ring-like metallic seal 40 which in turn seats on the impeller of pump 57 to help prevent fluid from leaking along shaft 35 and the impeller of pump 57 is firmly attached to shaft 35. The opposite end of shaft 35 has an exactly similar arrangement to support another impeller. At one end of shaft 43 is a similar arrangement except that a multi-bladed turbine wheel 45 is firmly attached to shaft 43 by means of cap screw 46. The opposite end of shaft 43 is also similar except that sleeve 39 and sealing ring 40 are omitted and the end of shaft 43 is slotted so that it can be fitted to a mating shaft of an accessory device.

Figure 1 shows that housing 28 is so shaped that housings 56a and 57a can be fastened to it by means of bolts 67.

Disklike member 48 (Fig. 1) serves as a support for thrust bearing 33 and as a head for hydraulic cylinder 55. A central hole is provided in member 48 to permit passage of shaft 16 and a fluid-tight seal 68 is provided.

The left hand end of shaft 16 is reduced in diameter to allow bearing 50 to be placed about it and against the shoulder created by the reduction in diameter of shaft 16. Circular piston 69 is closely fitted about and is held to the outer race of bearing 50 by retaining ring 53. Bearing 50 and attached piston 69 are fastened to the end of shaft 16 by means of bolt 52 which has a washer 51 beneath its head, and sealing rings 54 are set in the periphery of the piston. A cap 49 is fastened to piston 69 by means of screws or the like, and a resilient gasket 53 is provided between members 49 and 69. These members prevent passage of hydraulic fluid through bearing 50.

Cylinder 55 is fitted over piston 69 and is attached by stud bolts 71 to member 48 and housing 28 thus forming a chamber on each side of piston 69. Each of these chambers has an opening through which hydraulic fluid can be forced in or out, designated 72 and 73.

At the right hand end of the engine, circular collar 22 is threaded tightly onto member 13 and sealing rings 74 are provided to create a gas-tight joint at the junction between these two members. Collar 22 has an annular lip about its inside periphery to bear against a similar lip on the outer periphery of cylinder 12 of the injector head. Cylindrical combustion chamber wall 23, of slightly smaller diameter than collar 22, is welded to collar 22 substantially in the position shown and this wall 23 is of formed thin metal with a bell-shaped outer end formed into it. To this outer end of chamber wall 23 is welded annular exhaust nozzle 24 also of thin formed metal. This nozzle reduces rapidly in diameter to a throat of considerably smaller diameter than that of the smallest diameter of chamber wall 23 and then more gradually expands in diameter to its open end. About the exterior of chamber wall 23 is a thin metal jacket 25 welded to the periphery of collar 22 and spaced apart from wall 23 by the thickness of a helical winding of heavy wire 75. Jacket 25 is of the same shape as chamber wall 23 but is of larger diameter. Attached to the outer end of jacket 25 is a nozzle jacket or baffle 26. Baffle 26 is also spaced from nozzle 24 by the thickness of a helical winding of wire 76. The outer end of baffle 26 is shorter than that of nozzle 24 to provide communication with an annular chamber 77 formed by cylindrical shell 27 which is welded to the intersection of jacket 25 and baffle 26 and to the periphery of the outer end of nozzle 24. An inlet 78 to chamber 77 and an outlet 79 from the space between chamber wall 23 and jacket 25 are provided.

Figure 5:
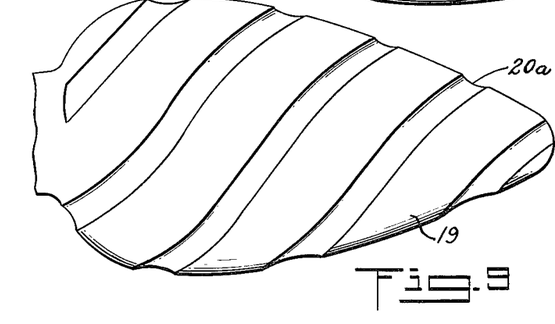
Fig. 5 is a diagrammatic arrangement showing the operating controls for the motor.

Figure 5 shows a normally closed valve 80 connected by means of pipes 82 and 82a to the outlet of oxidizer pump 57 and by pipe 83 to inlet 78 at the outer end of the engine cylinder. This valve 80 has a closure element 80a carried by a stem 80b connected to a bellows 80c. Air or gas pressure applied to the interior of the bellows will push rod 80b and lift the element 80a from its seat to effect communication between pipes 82 and 83. Upon release of the pressure, the spring 80d will return the closure element to normal closed position. A similar normally-closed valve 81 is connected by means of pipe 84 to the outlet of fuel pump 56 and by pipe 85 to chamber 64.

The course of flow of the propellants can now be traced through the engine. Oxidizer is forced by pump 57 from oxidizer supply tank 97 through pipe 82 to valve 80. From valve 80, it is carried by pipe 83 into chamber 77 whence it passes through the space between nozzle 24 and baffle 26 (Fig. 1) for the purpose of cooling nozzle 24. Oxidizer then flows through the space between chamber wall 23 and jacket 25 for cooling purposes, and for preheating of the oxidizer, and flows through outlet 79 and pipe 86 into chamber 87. From annular chamber 87, the oxidizer is admitted to the combustion chamber through the small orifices 59.

Fuel is forced by pump 56 (Fig. 5) from fuel supply tank 98 through pipe 84 to valve 81. From valve 81, fuel flows through pipe 85 into chamber 64 (Fig. 1). Ports 60 admit fuel from chamber 64 to the central hole in shaft 16 through which it flows outward until it passes into the space between restrictor bulb 17 and its jacket 19. It also flows through the space between vanes 21 and their jackets 20. Fuel then flows through the annular space between shaft 16 and its shell 18 whence it is admitted to annular chamber 88 through round ports 90 and slotted ports 89. From chamber 88, the fuel is admitted to the combustion chamber through the small orifices 58 where the stream of fuel meets the stream of oxidizer and combustion takes place.

Figure 7:
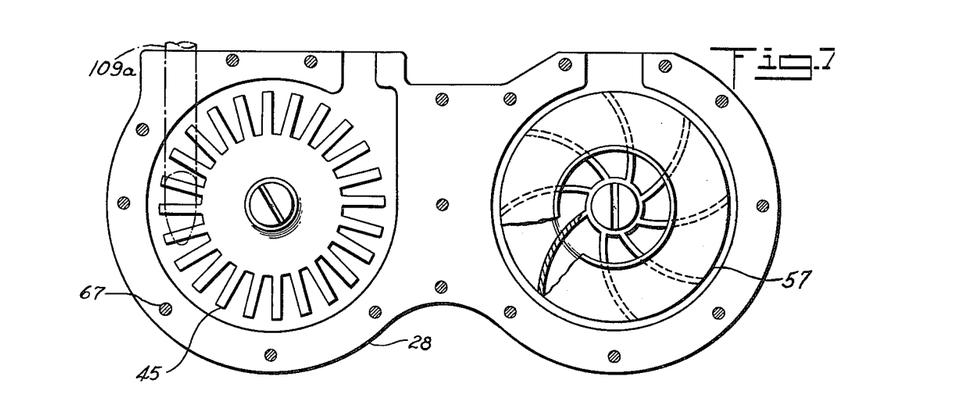
Fig. 7 is a section in diagrammatic form taken on lines 7—7 of Fig. 6.

Fuel and oxidizer are supplied from separate supply reservoirs 97 and 98, each of which is connected by piping directly to its respective pump, tank 97 being connected to pump 57 and tank 98 being connected to pump 56. An air pressure supply tank 106 is connected by means of conduit 109b through manually operated valve 109 to housing 28 through pipe 109a in such a manner that air from supply tank 106 will strike upon the blades of turbine wheel 45 and cause it to rotate (see Fig. 7). Air supply tank 106 is also connected by means of conduit 108b through manually-operated valve 108. From valve 108, connection is made by means of conduit 108a to valve 110, from which conduits 110b and 110a lead to pressure-responsive operating elements such as 80c of each of control valves 80 and 81 respectively.

The engine is started by first causing rotation of turbine wheel 45 by opening manually-operated valve 109 to allow a blast of air from pressure tank 106 to strike upon the blades of the turbine wheel. Through the gearing arrangement previously described, the impellers of pumps 56 and 57 will be caused to rotate to pump oxidizer and fuel from supply tanks 97 and 98 to their respective control valves 80 and 81. Vent valve 110 is of a type which allows passage of air through its body from pipe 108a but which provides a manually-operated vent to the atmosphere when it is desired to release the pressure on elements 80c of valves 80 and 81. This vent is kept closed during starting and operation of the motor and is opened upon stopping of the motor to allow valves 80 and 81 to restore themselves to a closed position in readiness for another cycle of operation. When sufficient pressure is developed in the system to start the engine, valves 80 and 81 are opened by opening manually-operated valve 108 to allow air under pressure from supply tank 106 to flow to their pressure responsive operating elements. Upon operation of propellant valves 80 and 81, fuel and oxidizer will flow to the combustion chamber in the manner previously described. The fuel and oxidizer ignite upon meeting one another in the combustion chamber causing a rush of hot gases past vanes 20 of the restrictor bulb 17. The rush of gases upon the vanes, which are inclined to the direction of flow, produces a torque upon shaft 16 which then rotates and drives pumps 56 and 57. Valve 109 can then be closed to stop further flow of gas under pressure to turbine wheel 45, but valve 108 is allowed to remain open so that pressure will be maintained upon the pressure sensitive elements of control valves 80 and 81 to keep them open. This starting procedure is followed regardless of the position of the throttle handle.

The speed of rotation of shaft 16 and pumps 56 and 57 is determined by the position of vanes 20 in relation to the belled outer end of chamber wall 23. If they are nearest the point 23a of chamber wall 23, i. e. toward the left in Fig. 1, the velocity of flow of the hot gases of combustion will be high since the area through which the gases can flow past vanes 20 is relatively small resulting in a high speed of rotation of shaft 16 and pumps 56 and 57 and a consequent high rate of delivery of propellants to the combustion chamber. If vanes 20 are nearest to the point 23b of chamber wall 23, i. e. in the position shown in Fig. 1, the velocity of flow of the hot gases past vanes 20 will be low since the area through which the gases must flow is relatively large, resulting in a low speed of rotation of shaft 16 and pumps 56 and 57 and a consequent low rate of delivery of propellants to the combustion chamber.

This effect thus automatically provides a proper supply of propellants to the combustion chamber for each position of the nozzle restrictor 19 as it is moved into or out of throat 24a of nozzle 24 for the purpose of increasing or decreasing the propulsive thrust output of the motor as explained previously.

The position of restrictor bulb 19 is controlled by movement of throttle handle 94 which is connected by a suitable linkage to piston 93 to move it and thus force hydraulic fluid through pipes 91 and 92 and openings 72 and 73 into the space on one side or the other of piston 69 in cylinder 55. For example, movement of handle 94 to the right, in Fig. 5, moves piston 93 to the left, forcing hydraulic fluid through pipe 92 into cylinder 55 through opening 72, and causes it to exert a force upon piston 69 moving it and attached shaft 16 toward the right. Conversely, movement of handle 94 to the left, moves piston 93 to the right forcing hydraulic fluid through pipe 91 into cylinder 55 through opening 73, and causes it to exert a force upon piston 69 moving it and attached shaft 16 toward the left. Hydraulic fluid is supplied from reservoir 96 and flows to both sides of piston 93 through suitable piping and check valve 95.

Figure 8:
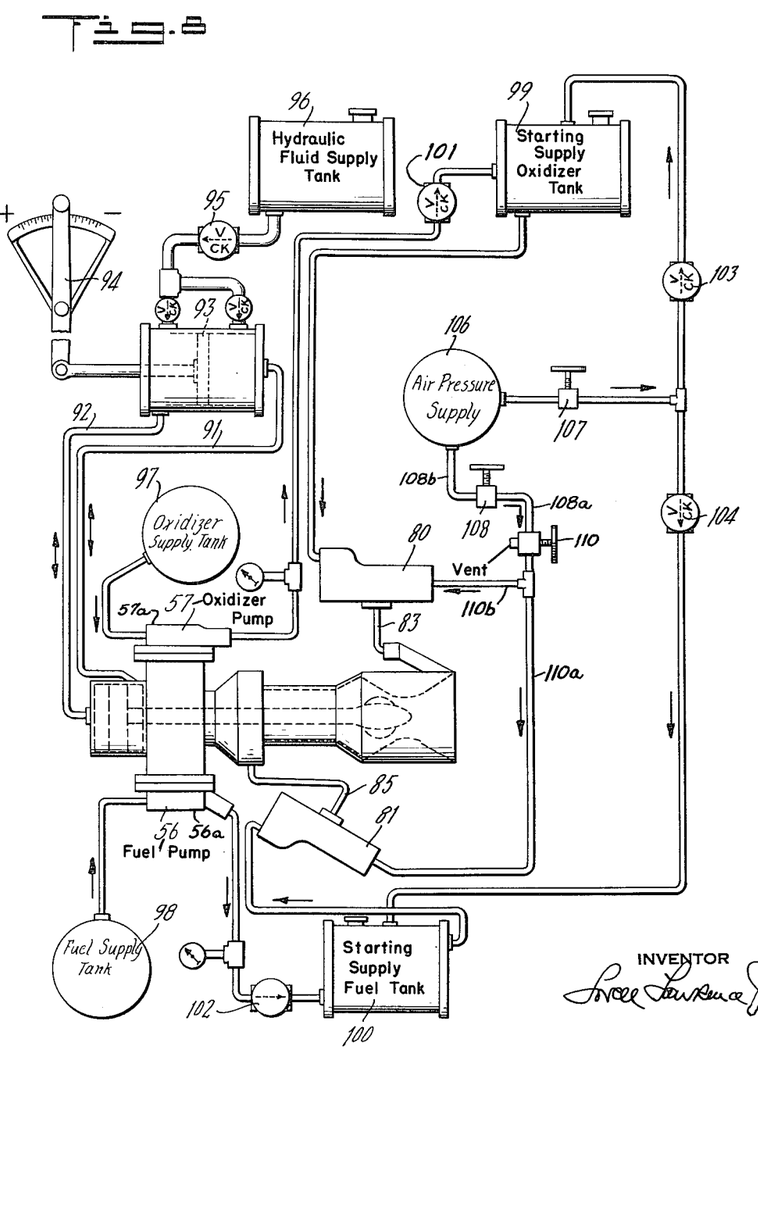
Fig. 8 is a modified arrangement of operating controls for the motor.

An arrangement for starting the engine without the use of turbine wheel 45 is shown in Fig. 8. This would be advantageous in the event that it became necessary or desirable to use both ends of shaft 43 to drive accessory devices.

Such an arrangement involves the addition of two pressure tanks 99 and 100 and several check valves. Valve 109 and the pipe to turbine wheel 45 are eliminated. Tank 99 is installed in the pipe connecting control valve 80 and pump 57. A check valve 101 is located in the pipe between tank 99 and pump 57 to prevent fluid from passing out of tank 99 in that direction. A similar tank 100 is installed in the pipe connecting control valve 81 and pump 56. A check valve 102 is located in the pipe between tank 100 and pump 56 to prevent fluid from passing out of tank 100 in that direction. Tanks 99 and 100 are both connected by piping to air pressure supply tank 106. Manually operated valve 107 is provided so that air from tank 106 can flow to tanks 99 and 100. Check valves 103 and 104 are located as shown to prevent any air or liquid flow back to tank 106. The remainder of the system is exactly the same as that in which turbine wheel 45 is used for starting.

Tanks 99 and 100 are filled with liquid oxidizer and fuel respectively and their pressure caps are replaced. Valve 107 is then opened by hand to allow air under pressure to enter tanks 99 and 100 forcing fuel and oxidizer from the tanks to their respective control valves. Valve 108 is then opened by hand allowing air under pressure to flow to the pressure responsive operating elements of control valves 80 and 81 causing them to open to admit fuel and oxidizer to the engine. When fuel and oxidizer meet within the combustion chamber, combustion occurs and the hot gases cause rotation of shaft 16 in the manner previously described. Pumps 56 and 57 are therefore driven and deliver fuel and oxidizer to tanks 99 and 100 and thence to the engine.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a reaction motor, a combustion chamber, a head and an exhaust nozzle at opposite ends of said chamber, and a nozzle restricting member, having vanes thereon, means for supporting said member adjacent said nozzle for movement along the longitudinal central axis of said chamber and nozzle and for rotation on said axis, a means operated upon rotation of said nozzle restricting member, said rotation being brought about by the action of the rush of hot gases of combustion against the vanes on said restricting member.

2. In a reaction motor, a combustion chamber, a head and an exhaust nozzle at opposite ends of said chamber, a nozzle restricting member, means on said member for causing rotation of said member by the action of the combustion gases on said means, means for supporting said member adjacent said nozzle for movement along the longitudinal central axis of said chamber and nozzle and for rotation on said axis, and a shaft fixedly attached to said restricting member.

3. In a reaction motor, a combustion chamber, a head and an exhaust nozzle at opposite ends of said chamber, a nozzle restricting member, means on said member for causing rotation of said member by the action of the combustion gases on said means, means for supporting said member adjacent said nozzle for movement along the longitudinal central axis of said chamber and nozzle and for rotation on said axis, a shaft fixedly attached to said restricting member, gearing longitudinally slidable on said shaft and a plurality of propellant supply pumps driven thereby.

4. In a reaction motor, a combustion chamber, a head and an exhaust nozzle at opposite ends of said chamber, a nozzle restricting member, means on said member for causing rotation of said member by the action of the combustion gases on said means, means for supporting said member adjacent said nozzle for movement along the longitudinal central axis of said chamber and nozzle and for rotation on said axis, a shaft fixedly attached to said restricting member, gearing longitudinally slidable on said shaft, a pump driven through said gearing, a source of propellant supply, a connection between said source and said pump, a further connection between said pump and said combustion chamber whereby the rate of flow of propellant is controlled by the pump.

5. In a reaction motor, a combustion chamber, a head and an exhaust nozzle attached at opposite ends of said chamber, a nozzle restricting member, means on said member for causing rotation of said member by the action of the combustion gases on said means, means for supporting said member adjacent said nozzle for movement along the longitudinal central axis of said chamber and nozzle and for rotation on said axis, a shaft fixedly attached to said restricting member, gearing on said shaft and a rotary pump driven through said gearing, and means for initiating, through said gearing, rotation of said pump, said means comprising a turbine wheel having at a distance from its center of rotation provision for deflection of the path of flow of a fluid whereby the reaction of said fluid against said rotor causes rotation thereof, and rotation of said pump.

6. In a reaction motor, a combustion chamber, a head and an exhaust nozzle at opposite ends of said chamber, a nozzle restricting member, means on said member for causing rotation of said member by the action of the combustion gases on said means, means for supporting said member adjacent said nozzle for movement along the longitudinal central axis of said chamber and nozzle and for rotation on said axis, a shaft fixedly attached to said restricting member, a means operated upon rotation of said shaft and restricting member, and a hydraulic means for moving said shaft and restrictor along the longitudinal central axis of said chamber and nozzle, said means comprising a piston attached to one end of said shaft, a cylinder in which said piston is slidable, a similar second piston and cylinder, said second piston being slidable in said second cylinder by movement of a handle, a conduit connecting the interior of one end of said cylinder with the interior of one end of the second cylinder, a conduit connecting the interior of the other end of said cylinder with the other end of the second cylinder and hydraulic fluid contained within said system, whereby movement of said handle and attached piston causes hydraulic fluid to be forced against said first piston to move it and its attached shaft.

7. In a reaction motor, a combustion chamber, a head and an exhaust nozzle attached at opposite ends of said chamber, a nozzle restricting member, means on said member for causing rotation of said member by the action of the combustion gases on said means, means for supporting said member adjacent said nozzle for movement along the longitudinal central axis of said chamber and nozzle and for rotation on said axis, a shaft fixedly attached to said restricting member, gearing on said shaft and rotary pumps driven through said gearing, means for moving said shaft along the axis, propellant reservoirs communicating with said pumps to supply propellants thereto, propellant valves connected to said pumps and to said combustion chamber to control the flow of propellants to said combustion chamber, means for initiating rotation of said pumps for starting purposes, a reservoir containing a gas under pressure, conduits connecting said reservoir to pressure-responsive operating elements of each of said propellant valves, and a valve to control the flow of gas through said conduits to the pressure-responsive operating elements of said propellant valves.

8. The invention set forth in claim 7 with the starting means comprising a gas-driven turbine wheel connected through gearing to said rotary pumps so as to cause rotation thereof, a conduit from said reservoir of gas under pressure to said turbine wheel, said conduit being so disposed as to direct the flow of gas from said reservoir onto the blades of said turbine wheel to cause rotation thereof, and a valve located in said conduit to control the flow of gas to said turbine wheel.

9. In a reaction motor, a combustion chamber, a head and an exhaust nozzle at opposite ends of said chamber, a nozzle restricting member, means for supporting said member adjacent said nozzle for movement along the longitudinal central axis of said chamber and nozzle and for rotation on said axis, a shaft fixedly attached to said restricting member a means operated upon rotation of said shaft and restricting member, and said combustion chamber being cylindrical throughout its length but of increased diameter near its point of attachment to the nozzle and of a contour substantially similar to that of the inner end of the said annular restricting member, whereby movement of said restricting member along its longitudinal axis causes the space between said member and the wall of the said combustion chamber to be reduced or increased depending upon the direction of motion, the velocity of flow of the gases of combustion through that space being thus increased or decreased accordingly, at least one vane located upon said nozzle restricting member within said space so as to deflect the flow of the gases of combustion to cause rotation of said nozzle restricting member, the speed of rotation thereof being dependent on the velocity of flow of said gases.

10. In a reaction motor, a combustion chamber, a head and an exhaust nozzle at opposite ends of said chamber, a nozzle restricting member, means for supporting said member adjacent said nozzle for movement along the longitudinal central axis of said chamber and nozzle and for rotation on said axis, a shaft fixedly attached to said restricting member, a means operated upon rotation of said shaft and restricting member, at least one groove in the surface of said restricting member inclined to the direction of flow of the gases of combustion so as to deflect said flow and cause rotation of said restricting member and its attached shaft.

11. In a reaction motor, the combination of a combustion chamber, a head, a housing, an exhaust nozzle, a jacket spaced from and surrounding said chamber and nozzle, a central shaft extending through said head and rotatable and slidable therein, said shaft having an ovate bulb on its outer end extending into the combustion chamber and nozzle to restrict the flow of hot gases from the said chamber through the space between the inner wall of said chamber and nozzle and the said bulb, at least one vane upon the exterior of said bulb inclined to the flow of hot gases so as to cause rotation of the bulb and its attached shaft, said shaft and bulb further having inner and outer internal concentric passages for the passage of propellants for cooling purposes, said outer passage communicating with an annular chamber in the head of the combustion chamber for passage of propellant thereto, and said inner passage communicating with an annular chamber within said housing for admission of this propellant into said inner passage and said inner and outer passages communicating at the outer end of the bulb, a gear slidably mounted upon said shaft but positively rotated thereby, two pinions mounted upon two separate shafts, said pinions meshing with said gear and driven thereby, a rotary pump impeller attached to the outer end of each of said separate shafts and driven thereby, means for housing said gears and said impellers, means for conducting a liquid propellant from one of the pumps to a pneumatically operated normally-closed valve and thence to the space between the inner and outer wall of said combustion chamber, into a second annular chamber of the head from whence the propellant flows through orifices into the combustion chamber, means for conducting a second liquid propellant from the second pump to a second pneumatically operated normally-closed valve and thence to the said annular chamber within said housing, a hydraulic means, responsive to movement of a manual throttle, for moving the central shaft and bulb into or out of the nozzle of the combustion chamber, an air-driven turbine for causing rotation of the central shaft for starting purposes, and a pneumatic circuit, including a source of gas pressure and a valve, for opening the propellant valves.

12. In a reaction motor, a combustion chamber comprising a head and a nozzle, a restricting member, means for rotatably supporting said member on the axis of and adjacent to said nozzle, means for adjustably positioning said member along its axis to vary the nozzle opening through which the gases escape from the chamber, said member having its surface configured to be acted upon and rotated by the escaping gases, and at least one pump for feeding fuel to said chamber positively driven in a rotary manner by said member upon rotation thereof.

13. In a reaction motor, a combustion chamber comprising a head and a nozzle, a restricting member, means for rotatably supporting said member on the axis of and adjacent to said nozzle, means for adjustably positioning said member along its axis to vary the nozzle opening through which the gases escape from the chamber, a vane extending from said member and inclined to said axis, acted upon by the escaping gases to rotate the member, and at least one pump for feeding fuel to said chamber positively driven in a rotary manner by said member upon rotation thereof.

14. The invention set forth in claim 12 in which the adjustable positioning means comprises a shaft secured to said member, slidably mounted along said axis and reciprocable within said head, and means for varying the axial position of the shaft within the head to thereby vary the relationship between the member and nozzle.

15. In a reaction motor having a combustion chamber comprising a head and a nozzle, a restricting member located adjacent to said nozzle to define the area of escaping gases and rotated by said gases, a means operated upon rotation of said shaft and restricting member, said member comprising a bulb having a passage therethrough and an envelope spaced from and partially surrounding said bulb, means on the exterior of said envelope to deflect the path of flow of gases from said combustion chamber to cause said rotation, a source of fuel supply, a connection between said passage and said source of supply, and a connection between said space and said combustion chamber whereby fuel will pass from said source through said passage, then into said space and then to said chamber to effect a heat exchange between the escaping gases surrounding the envelope and the fuel passing through said space.

16. The invention set forth in claim 12 in which auxiliary means is provided for initially rotating said member to feed fuel to the chamber, subsequent combustion of the fuel maintaining the rotation of the member.

17. The invention set forth in claim 12 in which the adjustable positioning means comprises a hydraulic device, acting upon said restricting member to effect positive positioning in either direction along its axis and to hold the member in adjusted position.

18. The invention set forth in claim 12 in which the adjustable positioning means comprises a shaft secured to said member, slidably mounted along said axis and reciprocable within said head, and means for varying the axial position of the shaft within the head to thereby vary the relationship between the member and nozzle, said last named means including a piston secured to the end of the shaft and means for applying fluid pressure to both sides of the piston in accordance with the desired direction of movement of the member.

LOVELL LAWRENCE, JR.

References Cited in the file of this patent

UNITED STATES PATENTS

| Number | Name | Date |
|---|---|---|
| 2,024,274 | Campini | Dec. 17, 1935 |
| 2,407,852 | Smith | Sept. 17, 1946 |
| 2,450,950 | Goddard | Oct. 12, 1948 |
| 2,455,845 | Wells | Dec. 7, 1948 |

FOREIGN PATENTS

| Number | Country | Date |
|---|---|---|
| 375,260 | Italy | Sept. 29, 1939 |

OTHER REFERENCES

"Astronautics," March 1944, article by C. P. Lent, pages 11 to 13, incl.

"Flight," March 20, 1947, article entitled "Rocket Engines," pages 231 and 232.